(12) United States Patent
Yamashita

(10) Patent No.: US 7,034,879 B2
(45) Date of Patent: Apr. 25, 2006

(54) IMAGING DEVICE FOR ID CARD PREPARATION AND ASSOCIATED METHOD

(75) Inventor: Mitsuo Yamashita, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 900 days.

(21) Appl. No.: 09/947,371

(22) Filed: Sep. 7, 2001

(65) Prior Publication Data

US 2002/0036701 A1 Mar. 28, 2002

(30) Foreign Application Priority Data

Sep. 22, 2000 (JP) .............. P2000-288333

(51) Int. Cl.
*H04N 5/22* (2006.01)
(52) U.S. Cl. .............. 348/333.05; 348/222.1; 348/239; 382/118
(58) Field of Classification Search .......... 348/333.05, 348/333.01, 333.11, 222.1, 239, 362, 229.1, 348/221.1, 231.3; 382/118
See application file for complete search history.

(56) References Cited

U.S. PATENT DOCUMENTS

| | | | |
|---|---|---|---|
| 5,469,536 A | | 11/1995 | Blank |
| 5,479,206 A | * | 12/1995 | Ueno et al. .............. 348/211.5 |
| 6,515,704 B1 | * | 2/2003 | Sato ....................... 348/333.11 |
| 6,665,015 B1 | * | 12/2003 | Watanabe et al. ........... 348/362 |
| 6,734,910 B1 | * | 5/2004 | Yumoto et al. ........ 348/333.05 |
| 2001/0050710 A1 | * | 12/2001 | Ellis et al. .................. 348/211 |

FOREIGN PATENT DOCUMENTS

| | | |
|---|---|---|
| EP | WO 90/10251 | 9/1990 |
| EP | 0 433 056 A2 | 6/1991 |
| EP | 0 433 056 A3 | 6/1991 |
| EP | 0 485 293 A2 | 5/1992 |
| EP | 0 583 908 A2 | 2/1994 |
| KR | 1998-0010592 | 4/1998 |

\* cited by examiner

*Primary Examiner*—Aung Moe
(74) *Attorney, Agent, or Firm*—Pillsbury Winthrop Shaw Pittman LLP (57) ABSTRACT

The imaging device displays an image under imaging at present and also past images picked up before it on the display means, thus at the time of continuous imaging, even when the next imaging is started immediately after end of imaging, an image after the framing process is displayed, for example, as an image picked up just prior, so that the imaging condition, for example, whether closing of eyes is caused in the image picked up already can be checked. Therefore, the next imaging can be started without waiting for the time required for the framing process after imaging, so that the imaging can be speeded up.

16 Claims, 6 Drawing Sheets

IMAGING DEVICE FOR ID CARD PREPARATION AND ASSOCIATED METHOD

CROSS REFERENCE TO RELATED APPLICATIONS

This application is based upon and claims the benefit of priority from the prior Japanese Patent Application No. 2000-288333, filed on Sep. 22, 2000; the entire contents of which are incorporated herein by reference.

BACKGROUND OF THE INVENTION

1. Field of the Invention

The present invention relates to an imaging device that picks up a facial image of a person and attaches the facial image to an ID card in association with an ID card preparing device and an imaging method.

2. Description of Related Art

Typically, in an ID card preparing device for preparing a so-called ID card, such as a driving license, having a facial image and various certificates, the facial image to be attached to a the card is picked up by a CCD camera of an imaging device as an electronic image and composed with the contents (the name of the person, license number, employee number) of the card, and the ID card is then prepared by a printing device.

In this case, the image picked up by the imaging device is not immediately printed in the imaged state, but an image process is performed on the image data so as to center the face position as well as delete unnecessary parts around the face. The resultant image is then displayed, and when the resultant image is judged to be suitable, it is output to a printing device as a card preparation image.

Further, in recent years, in a portable imaging device such as a digital camera, a plurality of picked-up images can be listed on a display unit attached to the camera and the imaging result can be checked.

Furthermore, there is an ID card preparing device available that enables the standard size face picture of a picked-up facial image of an applicant to be attached to a license preparation application (hereinafter referred to as an application), and the face picture on the application is picked up by a scanner or the digital camera so as to take in as an electronic image, and the face picture and also the applicant intrinsic information (license number, employee number, etc.) recorded on the application are taken in.

In this case, there is a method (called a confirmation mode) for displaying the taken face picture on the display screen of the ID card preparing device and to proceed with the preparation by checking the face picture and applicant intrinsic information for each applicant by an operator. There is also a method (called an automatic mode) for continuously performing a an automatic preparation process for a plurality of applications by the ID card preparing device and issuing a card preparation interruption command by an operator only when defects are found during the continuous preparation.

However, as mentioned above, in an imaging device that picks up a face picture as an electronic image, a so-called framing process of adjusting the picked up facial image to a predetermined image size and moving the face to the center of the image frame is performed automatically, and the processing result is displayed so that the operator can judge whether the face is properly positioned and the eyes are not closed. When the electronic image is judged to be suitable, the imaging device goes to imaging of the next person to be imaged and the image of the previous person to be imaged is sent to the printing device for card preparation. The framing process requires a fixed time, so that when the next imaging is to be carried out after confirmation of the processing result, a waiting time for the process is required, which places a limit on continuous imaging.

Further, in listing images of a plurality of imaged persons, such as in a digital camera, a problem arises that the next imaging cannot be carried out during the listing and when a picked-up image at the beginning person is questionable and re-imaging is required, the person to be imaged has left, so that he cannot be re-imaged.

Further, in picking up a face picture image of an applicant by a scanner as an electronic image, in both the aforementioned confirmation mode and automatic mode, a facial image displayed on the display screen is only of the applicant under processing. So that, in case of faults occurring during the taking of a face picture, such as malfunctions of the scanner or a mismatch between a facial image and applicant intrinsic information, there is a risk that the ID card would be prepared as it is.

SUMMARY OF THE INVENTION

An object of the present invention is to provide a imaging device and a imaging method, which enable the next imaging without waiting for the time required for the framing process after imaging and speed up the continuous imaging.

According to the embodiments of the present invention, an imaging device comprising a camera for picking up at least a facial image of a person to be imaged, an image processor for performing a predetermined image process for an image picked up by the camera, a display unit having a plurality of image display areas, and a controller for controlling the display unit so as to display an image under imaging at present and also the past images picked up before it in the aforementioned plurality of image display areas respectively on the basis of output of the image processor is provided.

Further, according to the embodiments of the present invention, an imaging method comprising a step of picking up at least a facial image of a person to be imaged, a step of performing a predetermined image process for the picked-up image, and a step of displaying an image under imaging at present and also the past images picked up before it respectively on the basis of the processed image is provided.

DETAILED DESCRIPTION OF TIDE EMBODIMENTS

Figure 1:
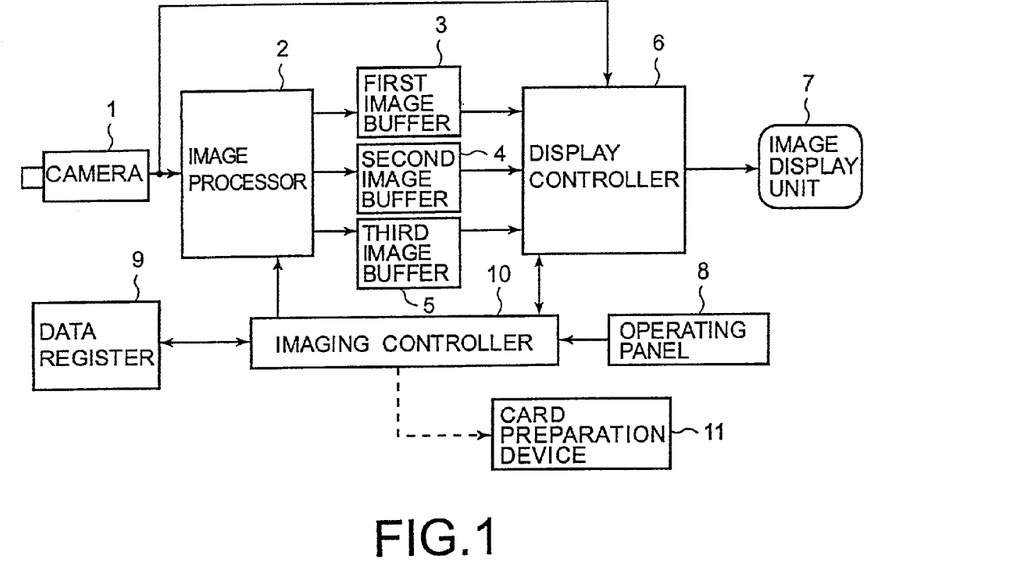
FIG. 1 is a block diagram schematically showing the constitution of an imaging device relating to one embodiment of the present invention.

The embodiments of the present invention will be explained in detail hereunder with reference to the accompanying drawings. FIG. 1 schematically shows the constitution of an imaging device relating to this embodiment. The imaging device is used, for example, in association with an ID card preparation device 11 for preparing an ID card, such as, a driving license with a facial image. The imaging device has a camera 1, such as, a video camera as an imaging means for directly picking up the facial image of a person to be imaged or picking up the facial picture that is at least a facial image of a person to be imaged has been picked up. The aforementioned imaging device has an image processor 2, as an imaging processing means, for performing a so-called framing process, such as adjusting a facial image picked up by the camera 1 to a predetermined image size and moving the face to the center of the image frame. Further, the aforementioned imaging device has a first image buffer 3 for temporarily holding an image processed by the image processor 2, a second image buffer 4, a third image buffer 5, a display controller 6 as a control means for displaying each image in the image buffers 3 to 5 on an image display unit 7 (which will be described later), in which the image display unit 7 operates as a display means having a plurality of image display areas. Furthermore, the aforementioned imaging device has an operating panel 8 for performing an imaging operation, a data register 9 for holding data such as an image number and name as identification information of a person to be imaged, and an imaging controller (CPU) 10 that acts as a control means for managing the entire control.

Figure 2:
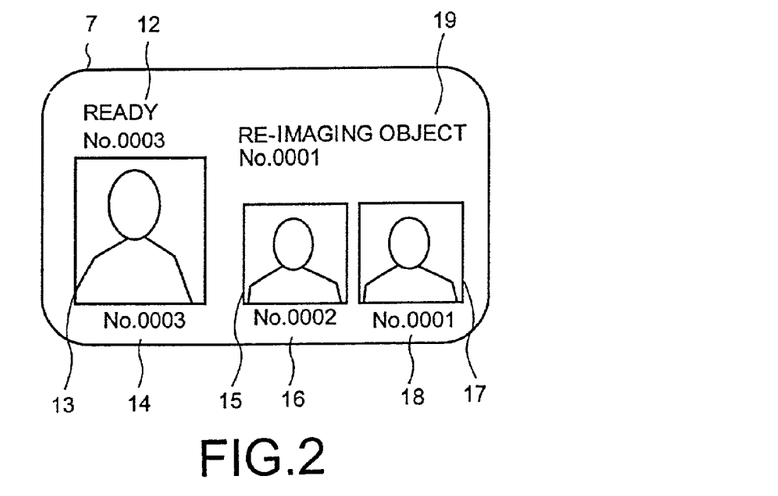
FIG. 2 is a drawing for explaining a display area of an image display unit of the imaging device of the aforementioned embodiment.

FIG. 2 shows display areas of the image display unit 7. Namely, the image display unit 7 has a letter display area 12 for displaying letters such as "Ready," an image display area 13 for displaying a facial image under present imaging, an image number display area 14 for displaying an image number relating to an image displayed on the image display area 13. Furthermore, the image display unit 7 has an image display area 15 for displaying a facial image picked up at a prior point in time to an image displayed on the image display area 13, an image number display area 16 for displaying an image number relating to an image displayed on the image display area 15. Also, the image display unit 7 has an image display area 17 for displaying a facial image picked at a prior point in time to an image displayed on the image display area 15, an image number display area 18 for displaying an image number relating to an image displayed on the image display area 17. Additionally, the image display area 7 includes a re-imaging request display area 19 for displaying an image number at the time of re-imaging.

In this example, the image display areas 15 and 17 for displaying facial images picked up in the past are set smaller than the image display area 13 for displaying a facial image presently under imaging.

The image display areas 13, 15, and 17 correspond to the first to third image buffers 3 to 5 shown in FIG. 1, respectively. Namely, in the image display area 13, the content of the first image buffer 3 is displayed, and in the image display area 15, the content of the second image buffer 4 is displayed, and in the image display area 17, the content of the third image buffer 5 is displayed.

Figure 3:
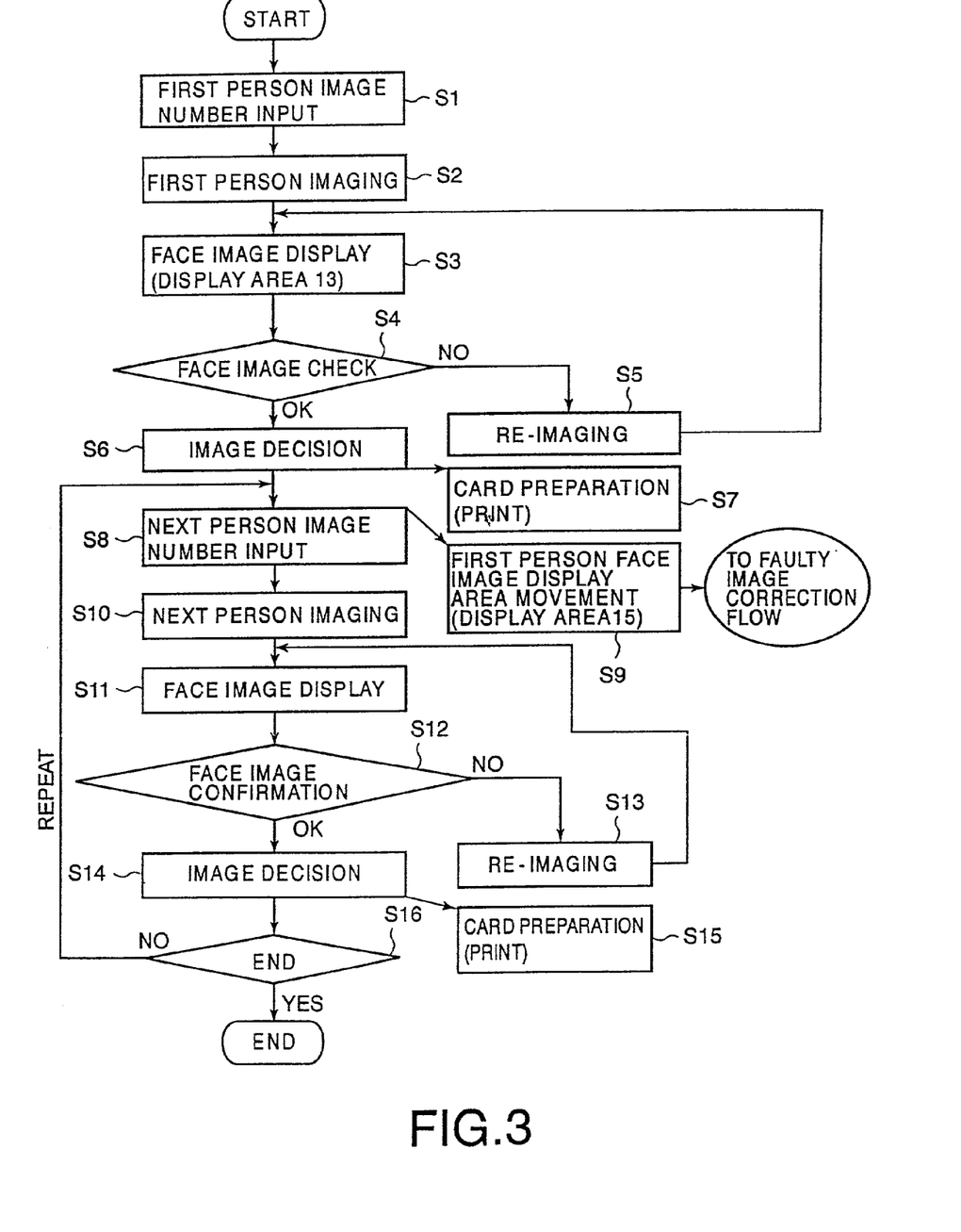
FIG. 3 is a flow chart for explaining a normal imaging process when a facial image of a person to be imaged is to be directly picked up by the imaging device of the aforementioned embodiment.

Next, in this constitution, an imaging process when a facial image of a person to be imaged is to be directly picked up will be explained by referring to the flow chart shown in FIG. 3. First, when the person to be imaged is positioned in front of the camera 1, a moving image thereof is displayed in the image display area 13 of the display unit 7 via the camera 1. At this time, the image number (generally, the identification number of the person such as the license number or employee number) relating to the person to be imaged may be input via the operating panel 8 (Step S1). The input image number is displayed in the image number display area 14 of the image display unit 7, and the input image number can be checked for accuracy, and the input image number may be stored in the data register 9.

When a first person out of numerous persons is to be imaged, the operator looks at the moving picture displayed in the image display area 13 of the image display unit 7, confirms the moment the person to be imaged is in a most suitable pose position, and takes a still image in this state by the camera 1. The taken facial image is sent to the image processor 2 and the display controller 6 and the facial image from the camera 1 is displayed in the image display area 13 of the image display unit 7 as a still image.

The image processor 2 then performs the framing process (Step S2) of making the still facial image sent from the camera 1 in a certain instance coincide with the predetermined image frame, in order to cut peripheral, unnecessary parts and move the face almost to the center of the image frame.

When the framing process is finished, the processed facial image is stored in the first image buffer 3. Then, the display controller 6 switches the display to display the facial image in the first image buffer 3 in the image display area 13 of the image display unit 7 (Step S3). By doing this, the image display area 13 is switched to the display of the facial image subjected to the framing process so that the face position and closing of the eyes can be checked. At this time, the image number display area 14 is kept with the inputted corresponding image number is displayed.

Then, the operator ascertains whether the facial image displayed in the image display area 13 of the image display unit 7 contains a fault (Step S4). When a fault, such as mis-positioning or closed eyes are found in the displayed facial image, the operator carries out re-imaging (Step S5). If no fault is found, the operator progresses to the imaging of the next person. In this case, when the image decision key of the operating panel 8 is pressed first (Step S6), the facial image displayed in the image display area 13 of the image display unit 7 is decided. Then, the aforementioned imaging controller 10 sends the decided facial image from the display controller 6 and the image number corresponding to the facial image from the data register 9 to the card preparation device 11, which is electrically connected to the imaging device, and the ID card is prepared (Step S7).

By the operator pressing the image decision key, the imaging controller 10 changes the imaging device to be ready to accept the image number of the next person to be imaged. And then, the operator inputs the image number of the next person to be imaged, that is, the second person to be imaged (Step S8). By doing this, the image display area 13 of the image display unit 7 is switched again to a facial image in a moving image state (i.e., the second person to be imaged sitting-down at the position in front of the camera 1) from the camera 1 and the first facial image in the first image buffer 3 is transferred to the second image buffer 4. The display controller 5 displays the facial image in the second image buffer 4 in the image display area 15 of the image display unit 7 and displays the image number in the image number display area 16 (Step S9).

When the second person to be imaged is to be imaged, the operator looks at the moving picture displayed in the image display area 13 of the image display unit 7, confirms the moment the person to be imaged is in a most suitable pose position, and takes a still image by the camera 1. The image processor 2 performs the framing process for the facial image sent from the camera 1 in the same way as discussed above (Step S10) and when the framing process is finished, the processed facial image is stored in the first image buffer 3. Then, the display controller 6 switches the display to display the facial image in the first image buffer 3 in the image display area 13 of the image display unit 7 (Step S11). By doing this, the image display area 13 is switched again to the display of the facial image subjected to the framing process and at that time, in the image number display area 14, the corresponding image number is displayed.

Then, the operator ascertains whether the facial image displayed in the image display area 13 of the image display unit 7 (Step S12) contains faults. When a fault, such as mis-positioning or eye closures are found in the displayed facial image, the operator carries out re-imaging (Step S13) and when no fault is found, the image decision key of the operating panel 8 is pressed (Step S14). Thus, the facial image displayed in the image display area 13 of the image display unit 7 is confirmed, and the confirmed facial image and the corresponding image number are sent to a card preparation device 11 so that the next ID card corresponding to the second person is prepared (Step S15).

As noted above, by pressing the image decision key, the imaging controller 10 changes the imaging device to be ready to accept the image number of the next (i.e., third person) to be imaged. When there is a third person to be imaged (Step S16), the operator returns to Step S8 and inputs the image number of the third person to be imaged, and the same process discussed above is repeated.

If a plurality of persons to be imaged are to be imaged continuously, while the image processor 2 performs the image process among the aforementioned processes after the first facial image is picked up, when the image number of the next person to be imaged is input, the display in the image display area 13 of the image display unit 7 is switched to the facial image of the moving image from the camera 1. By doing this, while the facial image of the next person to be imaged (the second person) is picked up, the first facial image finishing the framing process is sent to the second image buffer 4 and displayed in the image display area 15 of the image display unit 7. Therefore, the facial image after the framing process for the facial image picked up just prior is displayed in the image display area 15 and the operator can check for eye closure or other faults.

When the next person to be imaged (the third person) is additionally imaged in the same way, the facial image of the second person to be imaged in the second image buffer 4 is sent to the third image buffer 5 and displayed in the image display area 17 of the image display unit 7 and the image number of the corresponding second person to be imaged is displayed in the image number display area 18 of the image display unit 7.

Whenever the imaging is carried out in this way, the picked-up image is sequentially transferred to the next image buffer, and the display position (image display area) is also changed, thus the facial image of the previous person to be imaged is always displayed.

Figure 4:
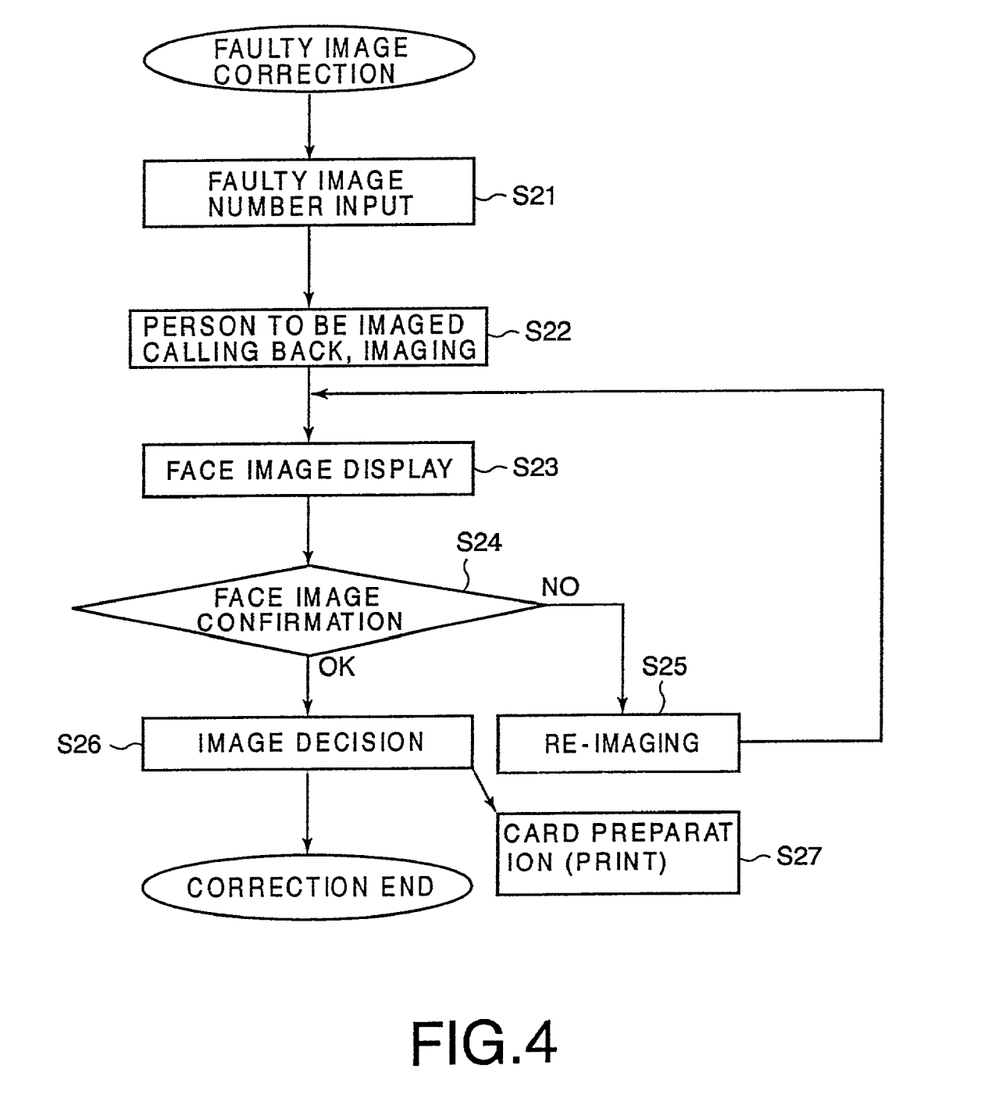
FIG. 4 is a flow chart for explaining a re-imaging process when a facial image of a person to be imaged is to be directly picked up by the imaging device of the aforementioned embodiment.

Next, in the processes shown in FIG. 3, the process when a fault is found in the facial image picked up previously after the picked-up facial image will be explained by referring to the flow chart shown in FIG. 4. When the operator finds a fault, such as eye closure, (the facial image displayed in the image display area 15 or 17) picked up before the present facial image being imaged, he inputs the image number (displayed at the lower part of the concerned image display area) of the facial image of the concerned fault from the operating panel 8 (Step S21).

Then, in the re-imaging request display area 19 of the image display unit 7, the letters of "Re-Imaging Object," for example, and the image number of the person with the faulty image are displayed, in order to clearly indicate the re-imaging process. At that time, the image display area 13 and the image number display area 14 of the image display unit 7 are switched to the display of the person with the faulty image, and the image number display area 14 is switched to the display of the image number of the person with the faulty image, and the image display area 13 displays the moving image fetched by the camera 1 before the re-imaging of the person with the faulty image begins.

Then, the person with the faulty image (generally one or two persons) who is to be re-imaged is called back immediately and re-imaged by the camera 1 (Step S22). The re-picked-up facial image is displayed in the image display area 13 of the image display unit 7 in a still image posed from the moving image state (Step S23) and then the facial image is checked (Step S24). When a fault is found in the displayed facial image in this confirmation, the operator carries out re-imaging again (Step S25) and when no fault is found, the image decision key of the operating panel 8 is pressed (Step S26), thus the re-picked-up facial image displayed in the image display area 13 is decided, and the decided facial image and the corresponding image number are sent to a card preparation device 11, and an ID card is prepared (Step S27).

According to the embodiment mentioned above, the operator does not need to wait for the next start of imaging until the framing process for the facial image under imaging is finished and the interval of continuous imaging can be shortened.

Further, a plurality of images and image numbers corresponding to those images are displayed simultaneously on the same image display unit, so that misinput of image numbers can be checked. Furthermore, the image number and name of a person to be re-imaged are displayed on the same image display unit, so that omission of re-imaging is prevented.

Next, the card preparation process, for example, when a fault such as closing of eyes is found in a picked-up facial image and re-imaging is required will be explained.

For example, when re-imaging of the facial image displayed in the image display area 17 which is picked up two images before is required in FIG. 2, the operator designates the concerned image number from the operating panel 8 and performs a card preparation process stop operation.

By this operation, the imaging controller 10 stops the card preparation process for the concerned facial image, makes the re-imaging request display area 19 of the image display unit 7 display the corresponding image number, displays it as an object requiring re-imaging, and registers it in the data register 9. In the re-imaging request display area 19, object data of a plurality of persons can be displayed sequentially and the corresponding plurality of object data is stored also in the data register 9.

In the above explanation, an image number is designated using the operating panel 8. However, the present invention is not limited to it and for example, a pointing device such as a mouse may be used so as to identify an image by moving the cursor or pointer on the screen of the image display unit 7 or a touch panel for designating an image by directly touching the screen of the corresponding image may be used.

Further, when information such as the name and address of a person to be imaged is stored in the data register 9 in relation to the image number (discrimination information of the person to be imaged), in the re-imaging request display area 19, not only the image number of a corresponding person to be re-imaged but also the name can be displayed.

Further, the buffers 3 to 5 for temporarily storing display images are explained so as to have a constitution of a storage unit independent of the data register 9. However, the present invention is not limited to it and facial image data may be stored in the same storage device as the data register 9 as a file (JPEG(Joint Photographic Experts Group) or TIFF(T-agged Image File Format) in a general form).

When re-imaging is required, the operator calls the person to be imaged who finishes imaging and for that purpose, the image number and name of the corresponding person may be informed by broadcasting or displayed on a monitor (not shown in the drawing) installed in a waiting room so as to request care.

Further, until the person requiring re-imaging arrives, the imaging of another person to be imaged can be continued in the same way as with the aforementioned imaging operation. In this case, the image display area 17 may display the facial image of a new person to be imaged or when there are a plurality of image display areas, may display the facial image of the new person to be imaged with the facial image of the person to be imaged requiring re-imaging held.

In this case, when the person requiring re-imaging arrives, the corresponding person to be imaged is selected from one or a plurality of objects displayed in the re-imaging request display area 19. As a selection means, the means such as the operating panel 8 already described, the pointing device, or the touch panel can be selectively used. When the corresponding person to be imaged is selected, the imaging controller 10 allows the image number display area 14 under imaging at present automatically to display the image number of the selected object to be re-imaged, allows the image display area 13 to display the facial image of the person to be re-imaged positioned in front of the camera 1, and can carry out imaging again.

When the re-imaging is finished, the image number of the corresponding person displayed in the re-imaging request display area 19 is erased and the re-imaging object data stored in the data resister 9 is given an identifier of re-imaging end and moved to another area of the data register 9 or deleted from the corresponding storage area. By doing this, a series of re-imaging processes are finished.

In the above explanation, re-imaging is to image the objective person to be imaged again. However, the present invention is not limited to it. For example, as described in the prior art, a plurality of facial images are picked up for a person to be imaged beforehand and in an imaging device structured so as to preserve them, a proper facial image free of faults, such as eye closures, is selected from a plurality of stored facial images in place of re-imaging and it is used for re-imaging.

In accordance with the aforementioned embodiment, a facial image requiring re-imaging can be simply selected and the image number and name of the corresponding person to be re-imaged can be displayed, so that the process can be performed simply and speedily.

Further, when the corresponding person to be re-imaged is designated on the screen from the display of the object to be re-imaged, the image number necessary for imaging can be designated briefly and the input process can be performed simply and speedily.

Figure 5:
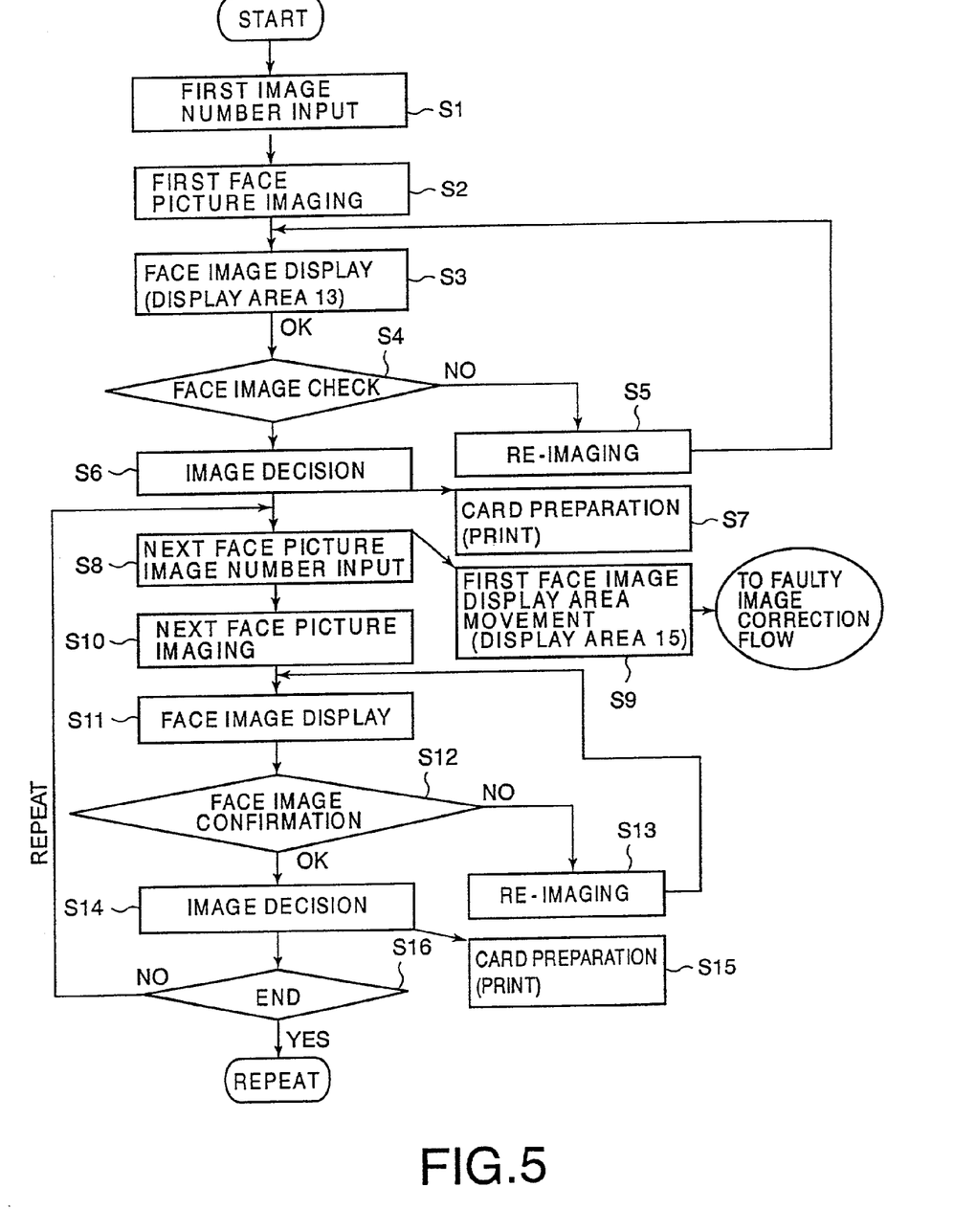
FIG. 5 is a flow chart for explaining a normal imaging process when a face picture of a person to be imaged is to be picked up by a imaging device of the second embodiment.

Next, as the second embodiment, the imaging process when the face picture of a person to be imaged is picked up and attached, for example, to a license preparation application will be explained by referring to the flow chart shown in FIG. 5. Firstly, when an application to which the face picture of an applicant is attached is set in the camera 1 such as a line sensor, the facial image which is fetched by picking up the face picture by the camera 1 is sent to the image processor 2 and the display controller 6 and the facial image from the camera 1 is displayed in the image display area 13 of the image display unit 7.

At this time, for example, the image number (generally, the identification number of the said person such as the license number or employee number) is input (Step S1) via the operating panel 8. The input image number is displayed in the image number display area 14 of the image display unit 7 and the accuracy of the input image number can be checked. In place of inputting the image number from the operating panel 8, by reading and recognizing the license number recorded in the associated license application beforehand by an optical letter reader, it can be input mechanically.

When the imaging of the first face picture is carried out, the image processor 2 performs the framing process of adjusting the facial image sent from the camera 1 to a predetermined image frame and cutting unnecessary peripheral parts so as to put the facial almost at the center of the image frame (Step S2). When the face picture is prepared in a predetermined size, the framing process may be omitted. However, if the brightness of the face picture of an applicant is too dark or too light, the image processor 2 performs a color gradation correction.

When the image process such as the framing process is finished by the image processor 2, the facial image after processing is stored in the first image buffer 3. Then, the display controller 6 switches the display so as to display the facial image in the first image buffer 3 in the image display area 13 of the image display unit 7 (Step S3). By doing this, the image display area 13 is switched to the display of the facial image subjected to the image process such as the framing process and can check for a fault, such as a displacement of the face or a noise line due to dust. At that time, in the image number display area 14, the corresponding image number is displayed.

Here, the operator ascertains whether the facial image displayed in the image display area 13 of the image display unit (Step S4) contains faults. When a fault, such as a displacement of the face or a noise line due to dust is found in the displayed facial image, the operator carries out re-imaging (Step S5) and when no fault is found, he goes to the next imaging. In this case, when the operator presses the image decision key from the operating panel 8 or instructs execution of the imaging process of the face picture of the next application (Step S6), the facial image displayed in the image display area 13 of the image display unit 7 is decided, and the decided facial image and the corresponding image number are sent to a card preparation device 11, and an ID card such as a driving license is prepared (Step S7).

Next, when the image number concerning the next applicant is input (Step S8), the image display area 13 of the image display unit 7 is switched to the facial image from the camera 1 again and the facial image in the first image buffer 3 is transferred to the second image buffer 4. The display controller 5 displays the facial image in the second image buffer 4 in the image display area 15 of the image display unit 7 and displays the image number in the image number display area 16 (Step S9).

When the next face picture is picked up, the image processor 2 performs the same framing process as discussed above for the facial image sent from the camera 1 (Step S10). Also in this case, when the face picture is prepared in a predetermined size, the framing process may be omitted.

When the image process such as the framing process is finished, the facial image after processing is stored in the first image buffer. Then, the display controller 6 switches the display so as to display the facial image in the first image bugger 3 in the image display area 13 of the image display unit 7 (Step S11). By doing this, the image display area 13 is switched to the display of the facial image subjected to the image process and at that time, in the image number display area 14, the image number input some time ago is displayed.

Here, the operator ascertains whether the facial image displayed in the image display area 13 of the image display unit (Step S12) contains faults. When an oversight of a fault, such as a noise line due to dust is found in the displayed facial image, the operator carries out re-imaging (Step S13) and when no fault is found, he presses the image decision key from the operating panel 8 or instructs execution of the imaging process of the face picture of the next application (Step S14), thus the facial image displayed in the image display area 13 of the image display unit 7 is decided. The decided facial image and the corresponding image number are sent to a card preparation device 11 and the next ID card such is prepared (Step S15).

Next, when there is the next application additionally (Step S116), the operator returns to Step 8 and inputs the image number concerning the next applicant, thus the same process as the aforementioned is repeated.

In the case of continuous imaging, while the image processor 2 performs the image process among the aforementioned processes after the first face picture is picked up, when the image number of the next application (the second application) is input, the display in the image display area 13 of the image display unit 7 is switched to the facial image from the camera 1. By doing this, while the face picture of the next applicant (the second applicant) is picked up, the first facial image finishing the image process, such as the framing process, is sent to the second image buffer 4 and displayed in the image display area 15 of the image display unit 7. Therefore, the facial image after the image process for the facial image picked up just prior can be checked.

When the face picture of the next application (the third application) is picked up in the same way, the facial image in the second image buffer 4 is sent to the third image buffer 5 and displayed in the image display area 17 of the image display unit 7 and the corresponding image number is displayed in the image number display area 18 of the image display unit 7.

Whenever the imaging is carried out in this way, the picked-up image is sequentially transferred to the next image buffer, and the display position (image display area) is also changed, thus the facial image of the face picture of the previous application is always displayed.

Figure 6:
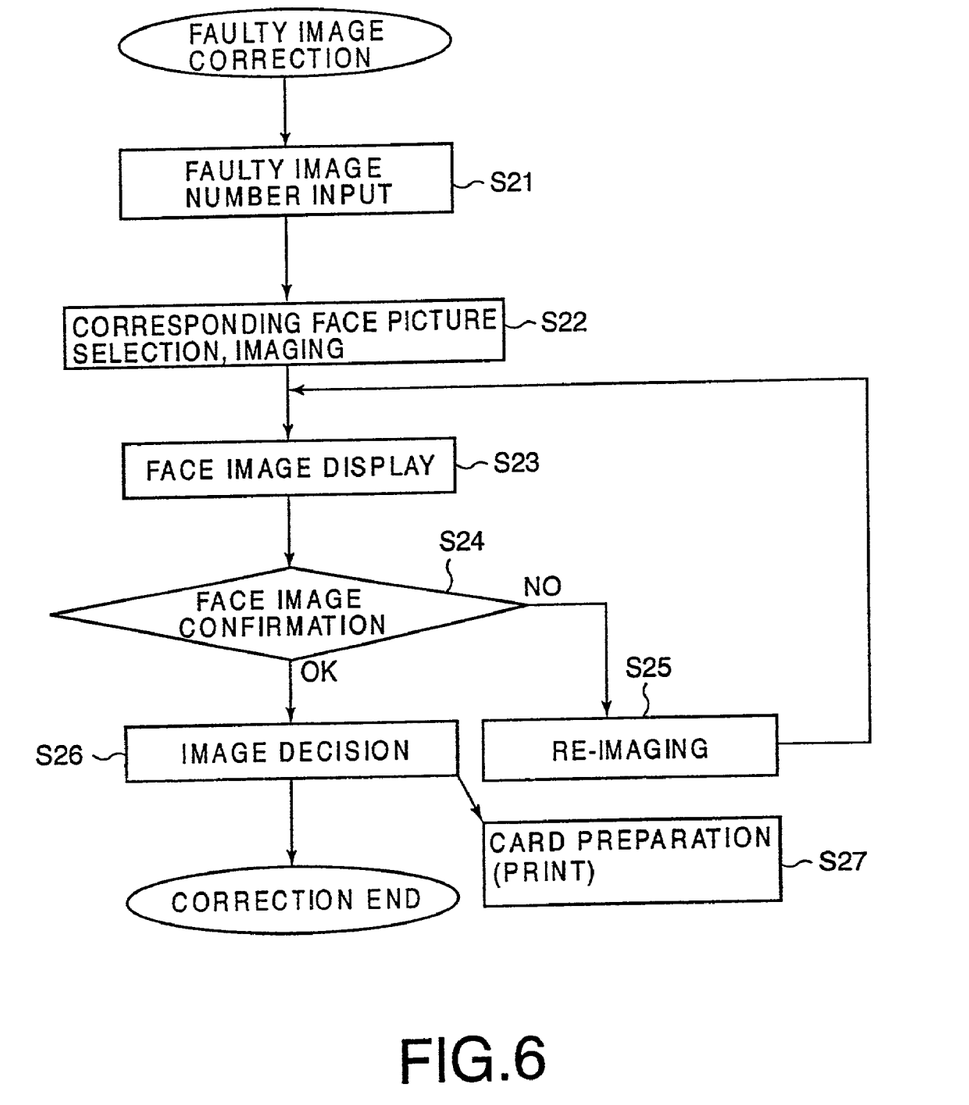
FIG. 6 is a flow chart for explaining a re-imaging process when a face picture of a person to be imaged is to be picked up by the imaging device of the second embodiment.

Next, for the processes shown in FIG. 5, the process when a fault is found in the facial image picked up previously after the picked-up facial image is decided will be explained by referring to the flow chart shown in FIG. 6. When a fault, such as an imaging fault of a noise line due to dust in the camera 1, is found in the facial image (the facial image displayed in the image display area 15 or 17) picked up before the facial image presently being imaged, the operator inputs the image number (displayed at the lower part of the concerned image display area) of the faulty facial image from the operating panel 8 (Step S21).

Then, the displays of the image display area 13 under current imaging and the image number display area 14 are switched to the faulty facial image and image number and in the re-imaging request display area 19, for example, the letters of "Re-imaging Object" and the faulty image number are displayed to clearly indicate the re-imaging process.

Then, the corresponding application to be re-imaged is selected and the face picture attached to the application is picked up (Step S22). The picked-up facial image is displayed in the image display area 13 of the image display unit 7 (Step S23) and then the facial image is checked (Step S24). When a fault is found in the displayed facial image during this confirmation, the operator carries out re-imaging again (Step S25) and when no fault is found, the image decision key of the operating panel 8 is pressed (Step S26), thus the re-picked up facial image displayed in the image display area 13 is decided, and the decided facial image and the corresponding image number are sent to a card preparation device 11, and an ID card is prepared (Step S27).

After selecting the facial image requiring re-imaging, re-imaging is not carried out immediately, and the corresponding application is kept, and the re-imaging process can be performed in a batch mode later.

Next, the third embodiment will be explained.

Figure 7:
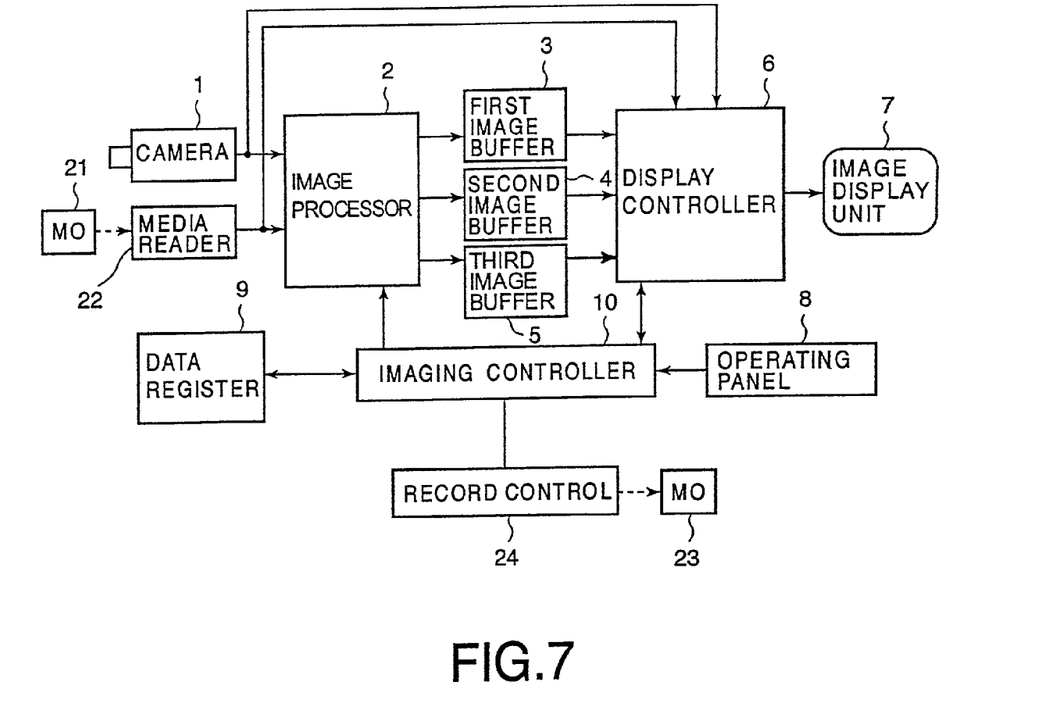
FIG. 7 is a block diagram schematically showing the constitution of an imaging device relating to the third embodiment of the present invention.

FIG. 7 schematically shows the constitution of an imaging device relating to the third embodiment. A difference of the third embodiment from the first and second embodiments is that a media reader 22 configured as storage media reading means for reading and inputting a facial image from a portable image storage medium 21, where at least the facial image of a the person to be imaged is picked up beforehand and stored. Also, a record controller 24 configured as a record control means for storing the decided facial image in a portable image store medium 23 is introduced.

The portable image storage medium 21 is, for example, a photo-electromagnetic disk (called MO), an IC card, or a memory card capable of storing at least a plurality of facial images of a person to be imaged which have been picked up as electronic images (for example, still images) by a digital camera beforehand along with the corresponding image numbers. In this case, a plurality of different facial images may be stored for a person.

When the image storage medium 21 is set, the media reader 22 reads and inputs a pair of facial images and corresponding image numbers from the image storage medium 21 to the image processor 2. The image processor 2 performs not only the image process of the facial image picked up by the camera 1, but also the same image process as the aforementioned for the facial image input from the media reader 22. The subsequent processes are the same as the aforementioned processes when the facial image is input only by the camera 1.

When the facial image is decided at Step 6 in the process mentioned above, the record controller 24 stores a pair of the decided facial images and the corresponding image numbers in the image storage medium 23 which is set at a particular time. As noted above, the image storage medium 23 is, for example, a photo-electromagnetic disk (MO), an IC card, or a memory card.

In this case, when the image storage medium 23 stores a plurality of pairs of facial images and image numbers as mentioned above is set in, for example, a card preparation device not electrically connected to the imaging device and reads a pair of facial image and image number, the card preparation process can be performed later in a batch.

In the aforementioned embodiment, a case that a plurality of facial images are displayed respectively in a plurality of image display areas provided in the same image display unit is explained. However, the present invention is not limited to it and a plurality of facial images can be displayed in separate image display units respectively. By doing this, an image can be decided after the framing process at a location away from the imaging device.

Further, in the aforementioned embodiment, a video camera is used as the camera 1. However, the present invention is not limited to it and for example, by using a digital camera (electronic steal camera) for picking up the facial image of a person to be imaged or a face picture as an electronic image or a scanner for picking up (reading) the face picture of the person to be imaged is picked up as an electronic image, so that the same process can be performed.

While the above provides a full and complete disclosure of the preferred embodiments of the present invention, various modifications, alternate constructions and equivalents may be employed without departing from the true spirit and scope of the invention. Therefore the above description and illustration should not be construed as limiting the scope of the invention, which is defined by the appended claims.

What is claimed is:

1. An imaging device comprising:
   a camera to pick up at least a face image of a plurality of persons to be imaged;
   an image processor that performs a framing process for each of the images picked up by said camera;
   a plurality of image buffer sections communicatively coupled to the image processor, each of the image buffer sections configured to store one of the images;
   a display unit having a plurality of image display areas; and
   a display controller communicatively coupled to said image buffer sections and configured to control the display unit so as to respectively display a most recent image and images prior to the most recent image in the plurality of image display areas based on the output of the image processor,
   wherein, during successive imaging of the plurality of persons, an image prior to the most recent image is subjected to the framing process while the most recent image is displayed in one of the image display areas in order to improve throughput of the imaging device.

2. An imaging device comprising:
   a camera to pick up at least a face image of a plurality of persons to be imaged;
   an image processor, communicatively coupled to said camera, that performs a framing process for each of the images picked up by said camera;
   a display unit having a plurality of image display areas;
   a display controller communicatively coupled to said image buffer sections and configured to control the display unit so as to respectively display a most recent image and images prior to the most recent image in the plurality of image display areas based on the output of the image processor; and
   an image selector configured to select one of the images prior to the most recent image for re-imaging when the selected prior image contains a fault,
   wherein, during successive imaging of the plurality of persons, the selected prior image subjected to re-imaging is displayed in one of the image display areas and the most recent image is displayed in another of the image display areas in order to improve throughput of the imaging device.

3. An imaging device according to claim 1 or 2, wherein the image display areas for displaying images prior to the most recent image in the display unit are smaller than an image display area for displaying the most recent image.

4. An imaging device according to claim 1 or 2, wherein the display unit comprises a plurality of image display units.

5. An imaging device according to claim 1 or 2, wherein the display controller controls the display unit so as to display an image and corresponding intrinsic discrimination information of the image on the display unit.

6. An imaging device according to claim 1 or 2, further comprising:
   a media reader configured to read and input a face image from a portable image storage medium that stores the face image of a person to be imaged,
   wherein the display controller selectively performs a predetermined image process for an image picked up by the camera or the image input by the media reader.

7. An imaging device according to claim 6, further comprising:
   a record controller to store the face image to which said predetermined image process is performed by said display controller in the portable image storage medium.

8. An imaging device comprising:
   imaging means for picking up at least a face image of a plurality of persons to be imaged;
   image processing means for performing a framing process for each of the images picked up by said imaging means;
   image buffer means communicatively coupled to the image processing means and configured to store the framed images;
   display means having a plurality of image display areas; and
   control means, communicatively coupled to said image buffer means, for controlling said display means so as to respectively display a most recent image and images prior to the most recent image in the plurality of image display areas based on the output of the image processing means
   wherein, during successive imaging of the plurality of persons, an image prior to the most recent image is subjected to the framing process while the most recent image is displayed in one of the image display areas in order to improve throughput of the imaging device.

9. An imaging device comprising:
   imaging means for picking up at least a face image of a plurality of persons to be imaged;
   image processing means for performing a framing process for each of the images picked up by said imaging means;
   image buffer means communicatively coupled to the image processing means and configured to store the framed images;
   display means having a plurality of image display areas;
   control means, communicatively coupled to said image buffer means, for controlling said display means so as to respectively display a most recent image and images prior to the most recent image in the plurality of image display areas based on the output of the image processing means; and image selecting means for selecting one of the images prior to the most recent image for re-imaging when the selected prior image contains a fault, wherein, during successive imaging of the plurality of persons, the selected prior image subjected to re-imaging is displayed in one of the image display areas and the most recent image is displayed in another of the image display areas in order to improve throughput of the imaging device.

10. An imaging device according to claim 8 or 9, wherein the image display areas for displaying images prior to the most recent image in the display unit are smaller than an image display area for displaying the most recent image.

11. An imaging device according to claim 8 or 9, wherein said display means comprises a plurality of image display units.

12. An imaging device according to claim 8 or 9, wherein said control means controls said display means so as to display an image and intrinsic discrimination information corresponding to said image on said display unit.

13. An imaging device according to claim 8 or 9, further comprising:

storage media reading means for reading and inputting a face image from a portable image storage medium that stores the face image of a person to be imaged wherein the display controller means selectively performs a predetermined image process for an image picked up by the imaging means or the image input by the storage media reading means.

14. An imaging device according to claim 13 further comprising:

record control means for storing the face image to which said predetermined image process is performed by the display control means in the portable image storage medium.

15. An imaging method comprising:

picking up at least a face image of a plurality of persons to be imaged;

performing a framing process for each of the picked-up images; and displaying a most recent image and images prior to the most recent image based on the processed images, wherein, during successive imaging of the plurality of persons, an image prior to the most recent image is subjected to the framing process while the most recent image is displayed in order to improve throughput of the imaging device.

16. An imaging method comprising:

picking up at least a face image of a plurality of persons to be imaged;

performing a framing process for each of the picked-up images;

displaying a most recent image and images prior to the most recent image based on the processed images; and selecting one of the images prior to the most recent image for re-imaging when the selected prior image contains a fault, wherein, during successive imaging of the plurality of persons, the selected prior image subjected to re-imaging is concurrently displayed with the most recent image in order to improve throughput of the imaging device.

* * * * *